Sept. 4, 1962  M. CLAUSNITZER ETAL  3,052,524
REACTOR VESSEL CONSTRUCTION
Filed April 20, 1960
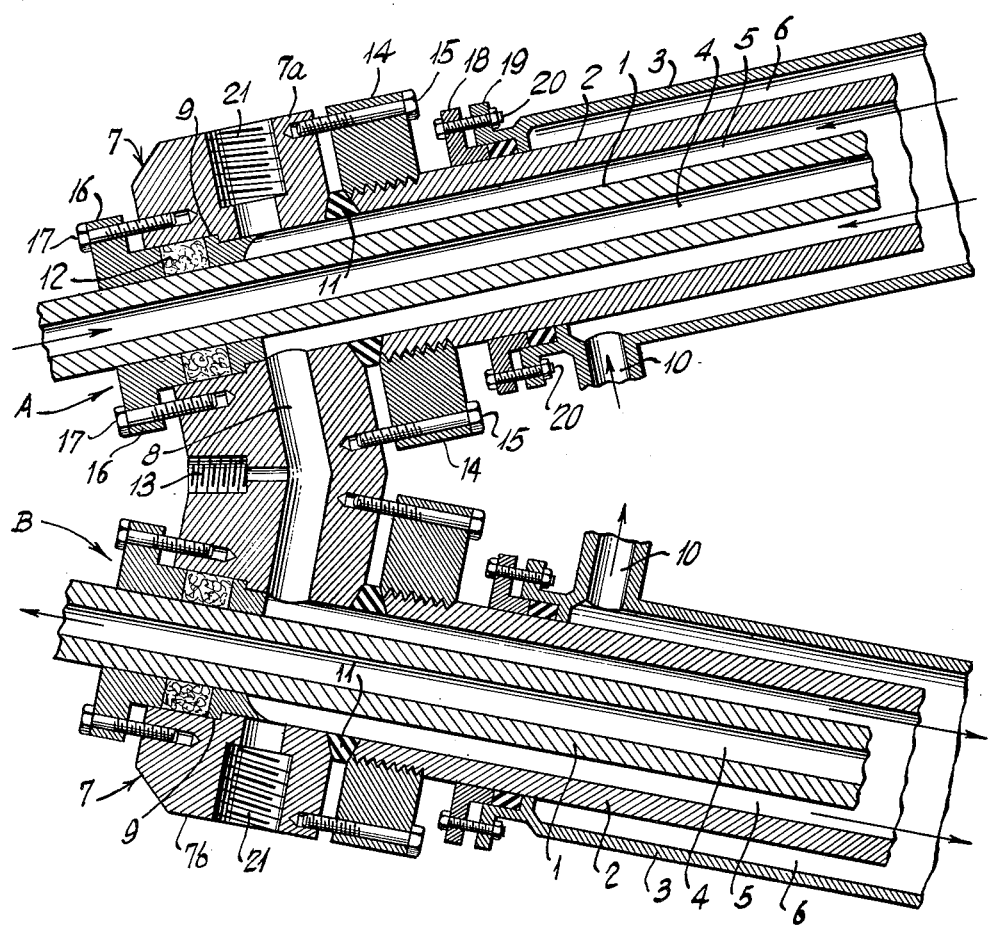
INVENTORS
MARTIN CLAUSNITZER
GERHARD GEISELER United States Patent Office 3,052,524
Patented Sept. 4, 1962

3,052,524
REACTOR VESSEL CONSTRUCTION
Martin Clausnitzer, Merseburg, and Gerhard Geiseler, Leuna, Germany, assignors to VEB Leuna-Werke Walter Ulbricht, Leuna, Germany
Filed Apr. 20, 1960, Ser. No. 23,424
9 Claims. (Cl. 23—252)

The present invention relates in general to reactor vessel construction and to a reaction system and in particular to a new and useful process and apparatus for the manufacture of high pressure polyethylene.

In the production of polyethylene the dissipation of the reaction heat is of prime importance. It is a well known fact that in the formation of 1 kg. polyethylene, approximately 900 kilocalories are evolved. If this heat cannot be dissipated in a satisfactory manner, inadmissible temperature increase will occur which frequently results in the disintegration of ethylene with sudden explosive decompositions. In such circumstances a large portion of the ethylene is broken up with the formation of soot and hydrogen. The yield, which is dependent on oxygen content and pressure, is thus limited by the inadequte heat dissipation.

When the polymerization is carried out continuously in a reaction tube, it is necessary to keep the internal diameter of the tube as small as possible. It is true that, with a large diameter tube, the cooling surface would be increased correspondingly. However, the flow velocity decreases by the second power. When, e.g., the diameter is doubled, the cross section of flow becomes four times as large, but the flow velocity will be four times as small and, correspondingly, the heat development four times as high. Since the cooling surface will only have been doubled, the heat dissipation is less favorable with larger tube diameters. An added inconvenience is the deposit of polymer at the wall, when flow velocity is low. This makes for poor heat transfer.

On the other hand it is necessary that reactors with small tube diameters be of great length when large quantities of ethylene are to be handled in large-scale production. This is required for insuring the necessary time of stay in the reactors. Such long tubes are difficult to handle and have a tendency toward clogging.

In order to overcome the above mentioned difficulties, it has already been suggested to pass ethylene in equal quantities through several tubes disposed in parallel, with throttles being arranged at the inlet ports for insuring uniform and continuous performance in the different tubes; the flow resistance in all throttles was to be equal, but much higher than that obtaining in the tubes.

While this mode of operation affords a much better heat dissipation, there is still room for improvement. Thus, it is almost impossible to avoid impurities from being taken along with the highly compressed ethylene, such impurities consisting of fine mechanical particles e.g. dust, rust and the like, which are deposited in the throttles where they cause clogging.

It is another drawback that the arrangement of a plurality of reaction tubes disposed in parallel, with their cooling jackets and the necessary supply pipes and discharge lines for coolant, make a very cumbersome and unwieldy structure.

It has been found that the above objects can be accomplished by a process in which the polymerization of ethylene is carried out in a plurality of reaction units, each having a reactor space which is surrounded by two spaces, one of which serves for the passage of a coolant and the other for conveying a heating agent. In this arrangement the coolant and the heating agent are made to flow through the outer and the innermost spaces, while the ethylene gas under pressure is made to flow therebetween.

It is a further feature of the invention that the ethylene is passed from one reaction zone to the one in the next unit throughout the plurality of units, the heating and cooling agents on the other hand are only allowed to pass through one unit and from there are returned either directly or indirectly to the heating and cooling systems from which they are supplied.

The apparatus for carrying out this process comprises a number of units, each having three tubes disposed: as an outer tube, an intermediate tube, and an inner tube. The heating or cooling agent passes through the outermost tube and through the innermost tube, while ethylene is made to travel through the intermediate tube.

Between the several units of the apparatus, coupling members are provided. These coupling members are constructed to receive the assembly of tubes at one end thereof, but are provided with bores that only permit the passage of gas from the intermediate tube of one unit to that of the adjacent unit. Outlets are provided in the couplings for the tubes conveying the coolant and heating agent either to direct them to the atmosphere, or to connecting passages which lead directly to the source of heating or cooling agent, respectively.

It is an object of the present invention to provide an improved method for making polyethylene.

A further object is to provide an improved heat transfer apparatus.

It is another object of the invention to provide a process for the manufacture of polyethylene wherein a continuous polymerization process can be carried out without undue accumulation of heat, in a simple and inexpensive manner.

It is yet another object of the invention to provide an apparatus for the polymerization of ethylene in large-scale production of polyethylene by simple and compact means which are easy to build and to maintain in operation.

It is a further object to provide a reactor for the manufacture of polyethylene which is simple in design, rugged in construction and economical to manufacture.

The invention will be fully understood and other objects and advantages thereof will become apparent from the following description and the drawing in which:

The only FIGURE of the drawing is a somewhat schematic longitudinal section through two of a plurality of reactor tubes constructed in accordance with the invention.

The reactor according to the invention is a "ring" reactor and comprises a plurality of units, called segments, only two of which, A and B, are illustrated. The opposite or right ends of each of the segments A and B are connected to the next adjacent segments in the same manner as indicated on the left side of the drawing, the next adjacent segments extending backwardly from a right end connection at angles toward the left.

Each segment is composed of three tubes, 1, 2 and 3, concentrically arranged one within the other in such a manner that there will be three spaces; a cylindrical central space 4, an inner annular space 5 and an outer annular space 6. Through the annular space 5 passes the ethylene gas to be polymerized, through spaces 4 and 6 flow heating agent and coolant, respectively.

Adjacent segments A and B are interconnected by coupling members generally designated 7 which are provided with passages 8; through these, gas from one annular space 5 is capable of passing to the annular space 5 of the adjacent segment.

Bores 9 are further provided through which tubes 1 are passed to the outside. The ends of tubes 1 are directly connected to the heating or cooling systems, respectively. The outer spaces 6 through which heating or cooling media are likewise passing, end before the coupling members 7 and are connected directly to their associated heating and/or cooling sources (not shown), through attachment pipes 10.

Between tubes 2 and coupling member 7, a flat washer 11 is provided, and at the emergence of tube 1, a stuffing box 12 is arranged in bore 9. 13 designates a bore for introducing a temperature measuring instrument into the gas passage within the coupling.

The coupling member 7 may advantageously be substantially rectangular in end view and includes an upper portion 7a which is angled from a lower portion 7b by an amount sufficient to permit clearance of the associated tubing while maintaining the apparatus with minimum space requirements. The outer tube 2 is advantageously secured to the coupling by means of a collar member 14 affixed to the tube and fastened to the coupling 7 by means of bolts such as indicated at 15. Similarly the packing 12 is held in position by a collar member 16 which is secured by bolts as at 17 to the coupling 7. A collar member 18 is secured to the tube 2 at a spaced location from the collar member 14 and the end of the outer tube 3 is flanged as at 19 and bolted to the collar member as by bolts 20.

The coupling internal passage 8 for the ethylene gas may be sealed at the top and botom ends of the coupling by plugs inserted into threaded cylindrical openings 21 at each end of the passage 8, if desired.

The arrangement of the tubes and the sealing members in the manner described prevents the high-pressure ethylene gas from penetrating into the heating or cooling systems in case of leakages.

The additional bore 13 permits temperature measurement of the gases traversing the coupling members of each individual segment in order to control the temperatures in the reaction zones by appropriate automatic regulation in the cooling and heating spaces.

The reactor system according to the invention has the advantage that by appropriate dimensioning the heat exchange surfaces, in relation to the reactor space, can be made considerably larger than in known reaction apparatus. Also, due to the fact that the central tube can be readily removed after the stuffing boxes have been taken out, easy cleaning of the reaction tube can be accomplished in case of need, and clogging is completely avoided.

What is claimed is:

1. A reactor for polymerization of ethylene and the like comprising a segment assembly including a first tubular member for the passage of a first temperature conditioning agent therethrough, a second tubular member extending around said first tubular member and defining an annular space with the exterior of said first tubular member for the passage of a reactant fluid therethrough, a third tubular member extending around said second tubular member and defining an annular space with the exterior of said second tubular member for the passage of a second temperature conditioning agent therethrough, said third tubular member having end walls sealed against said second tubular member at each end thereof, conduit means for directing said second temperature conditioning agent to and away from the interior of said third tubular member, and a coupling member for connecting said segment assembly to a similar segment assembly, including a top portion arranged at an angle from a lower portion, each of said portions including bores to receive one inner tubular member of said segment assemblies for passage therethrough, means for connecting the second tubular members of said assemblies to said coupling member with said annular reactant fluid space aligned therewith, and passage means on the interior of said coupling member extending from said top portion bore to said lower portion bore whereby to permit passage of reactant fluid from said one segment assembly in said top bore to the other segment assembly in said lower bore.

2. A method for the polymerization of polyethylene, which comprises effecting the polymerization by conducting the ethylene gas being polymerized in one direction in a central zone and conducting temperature conditioning media in a counter current to said direction in an inner and outer zone, respectively, said inner and outer zones being concentric with the gas conveying central zone.

3. A method for the polymerization of polyethylene which comprises effecting the polymerization by conducting the ethylene gas to be polymerized consecutively through a plurality of zones in a multiple-chamber reactor, said gas being conducted from zone to zone through a reversal of its path, and at the same time conducting temperature conditioning media in a counter current to the ethylene gas individually in each zone of its travel by passing said media through concentrically arranged zones inside and outside of said gas conducting zones.

4. An apparatus for the polymerization of polyethylene which comprises a tubular unit, each unit comprising a first tube for passing the polyethylene in one direction and second and third tubes, said second tube disposed within said first tube, and said third tube disposed outside thereof and enclosing said first tube, each of second and third tubes being capable of conveying a temperature conditioning medium in countercurrent to the polyethylene in said first tube.

5. A reactor for polymerization of ethylene and like polymerizable reactant fluids, comprising at least one pair of angularly spaced segment assemblies each including a first tube for the passage of a temperature conditioning medium therethrough, a second tube extending around said first tube and defining an annular space with the exterior of said first tube for the passage of said reactant fluid therethrough, a third tube extending around said second tube and defining a second annular space with the exterior of said second tube for the passage of a second temperature conditioning medium therethrough, said third tube having end walls sealed against said second tube at each end thereof, first conduit means connected to the inner passages of said first tube, second conduit means connected to said second annular space of the third tube, both of said conduit means being adapted to direct said respective first-named and second-named temperature conditioning media to and away from each of said segment assemblies independently from other assemblies, a coupling member angularly surrounding and operatively connecting one end of each of said segment assemblies in an adjoining pair, said coupling member including a top portion in the region of said one end of one segment assembly and a lower portion in the region of said one end of the other segment assembly in each of said pairs, each of said portions having a bore to receive said first tube of the segment assemblies for accommodation therein, means for connecting said second tubes to said coupling member with said first-named annular space aligned therewith, and passage means within said coupling member extending from said top portion bore to said lower portion bore, whereby to permit continuous passage of said reactant fluid between successive pairs of said segment assemblies, while said first-named and said second-named temperature conditioning media are made to flow to and away from each of said segment assemblies through said respective conduit means independently from the other assemblies.

6. A reactor for polymerization of ethylene and like polymerizable reactant fluids according to claim 5, wherein said pairs of segment assemblies are connected in a continuous zig-zag line with coupling members connecting each end of said segment assemblies with a successive other assembly in said line.

7. A reactor for polymerization of ethylene and like polymerizable reactant fluids according to claim 5, further including packing means in said bores of the coupling member extending inwardly from an end to said inner passages of the first tubes for preventing communication of said inner passages with said annular spaces for the passage of said reactant fluid.

8. A reactor for polymerization of ethylene and like polymerizable reactant fluids according to claim 5, wherein said second tubes include flanged end portions bolted to said coupling member.

9. A reactor for polymerization of ethylene and like polymerizable reactant fluids according to claim 5, further comprising means for connecting a temperature measuring instrument to said passage means, said connecting means comprising a bore provided in said coupling member between said top and said lower portions thereof and communicating with said passage means.

References Cited in the file of this patent

UNITED STATES PATENTS

| | | |
|---|---|---|
| 2,392,119 | Colbeth | Jan. 1, 1946 |
| 2,856,395 | Richard et al. | Oct. 14, 1958 |
| 2,870,997 | Soderstrom | Jan. 27, 1959 |